United States Patent [19]

Bannon

[11] 4,350,501

[45] Sep. 21, 1982

[54] ABSORPTION PROCESS

[75] Inventor: Robert P. Bannon, Houston, Tex.

[73] Assignee: Shell Oil Company, Houston, Tex.

[21] Appl. No.: 248,638

[22] Filed: Mar. 27, 1981

[51] Int. Cl.$^3$ ...................... B01D 53/04; C10G 25/03
[52] U.S. Cl. ............................................ 55/26; 55/62; 208/310 R; 585/822; 585/826
[58] Field of Search ................... 55/25, 26, 62, 68, 75; 208/310 R, 310 Z; 585/826, 822, 825, 820

[56] References Cited

U.S. PATENT DOCUMENTS

| | | | |
|---|---|---|---|
| 2,632,726 | 3/1953 | Ringham et al. | 55/62 X |
| 2,899,474 | 8/1959 | Ricards | 208/310 Z X |
| 2,912,473 | 11/1959 | Hutchings | 585/826 X |
| 2,985,589 | 5/1961 | Broughton et al. | 210/676 |
| 3,094,569 | 6/1963 | Thomas | 208/310 Z X |
| 3,176,445 | 4/1965 | Collins et al. | 55/62 X |
| 3,405,507 | 10/1968 | Spencer et al. | 55/62 |
| 3,451,924 | 6/1969 | Helfferich et al. | 585/826 X |
| 3,712,027 | 1/1973 | Hasz | 55/62 X |
| 4,176,053 | 11/1979 | Holcombe | 208/310 Z |
| 4,238,321 | 12/1980 | Florack | 208/310 Z |

*Primary Examiner*—Robert H. Spitzer

[57] ABSTRACT

A continuous, cyclic, vapor-phase adsorption process for the separation of normal paraffins from a hydrocarbon feed mixture, providing improved efficiency of separation and continuity of product flows. For purposes of this process, a continuous flow of the feed mixture and a continuous flow of an eluent are passed in repetitions of a particular sequence of six process steps to at least four adsorbent beds.

8 Claims, 12 Drawing Figures

ABSORPTION PROCESS

BACKGROUND OF THE INVENTION

This invention relates to an improved continuous adsorption process for the resolution of hydrocarbon mixtures into products of like molecular structure. More particularly, this process relates to the application of multiple molecular sieve adsorbent beds to the separation of normal paraffins from a vapor-phase hydrocarbon mixture containing the same.

It is recognized that resolution of the components of certain fluid solutions can be achieved through exploitation of the adsorptive properties of materials commonly known as molecular sieves. Such materials, principally the natural and synthetic aluminosilicates, have a porous crystalline structure with intracrystal cavities that are accessible via pores of relatively uniform diameter. Adsorption through the pores is selective—only molecules with an effective diameter smaller than the characteristic pore diameter of a particular molecular sieve can be adsorbed thereby. Thus, a basis is provided for separation of molecules according to size. Molecular sieves are particularly useful for accomplishing the separations of mixtures of hydrocarbons of differing molecular structures, for instance the separation of normal paraffins from mixtures also comprising branched and/or cyclic hydrocarbons, which separations are not generally feasible through more common techniques such as fractional distillation or solvent extraction.

In the application of a molecular sieve to such separations, a mixed feedstock is passed over a contained bed of the sieve material to accomplish adsorption thereon of selected molecules, termed the adsorbate fraction of the feedstock. Effluent from the bed comprises the remaining fraction of the feedstock, herein termed the raffinate. Adsorption is, of course, but one phase of the overall separation process, since the adsorbate must eventually be desorbed from the sieve. One common method for accomplishing such desorption involves discontinuing the flow of feedstock and passing a stream of an eluent over the bed. The eluent is generally a compound which is itself adsorbed through the sieve pores. For instance, when the adsorbate is a normal paraffin of a given carbon number, a preferred eluent is a normal paraffin of a different carbon number. In this case both the adsorption and desorption phases of the overall separations process involve interchange of eluent and adsorbate molecules on the sieve bed—adsorbate molecules are displaced from the sieve pores by eluent molecules during the desorption step and eluent is displaced by adsorbate during a subsequent adsorption step. A mixture of raffinate and eluent molecules is withdrawn as effluent from the bed during adsorption service by the bed, and a mixture of adsorbate and eluent is withdrawn during desorption. Such effluent mixtures, respectively termed the process raffinate and adsorbate products, are generally then subjected to further processing for the recovery of eluent for recycle to the adsorption beds.

With respect to the use of a given sieve bed for separations purposes, the performance of distinct adsorption and desorption steps does not permit a continuous process as is often desired for efficient commercial operations. It is recognized, however, that certain discontinuities associated with the use of a single bed can be eliminated and other processing advantages realized through the use of multiple sieve beds.

In the context of vapor-phase adsorption processes for the separation of normal paraffins from hydrocarbon mixtures, one such multi-bed process which has proven to be of particular advantage is that of U.S. Pat. No. 3,451,924. Through repeated switching of process flows to three adsorbent beds in a 6 step sequence, the process of this patent achieves continuity with respect to the flow of both hydrocarbon feed and eluent to the beds. Furthermore, through series flow of certain process streams through two adsorbent beds, the process provides for loading of each adsorbent bed to near the full capacity without loss of the normal paraffins to the process raffinate product.

The prior art process of U.S. Pat. No. 3,451,924 can be more particularly described through reference to attached FIG. 1, which in six parts, labeled (a) through (f), illustrates schematically each of the six process steps. Referring to FIG. 1(a), depicted therein is a step of the process in which a continuous flow of a vapor-phase normal paraffin-containing mixed hydrocarbon feed stream designated 10 is passed to a first sieve bed designated A which functions as a primary adsorption bed to adsorb said feed normal paraffins. Effluent, stream 11, is withdrawn from bed A and passed to another bed labeled B which serves as a secondary adsorption bed, capturing normal paraffins which escape adsorption in, or "break through", sieve bed A. A process raffinate product, stream 20, composed primarily of non-normal-paraffin hydrocarbons from the feed and of eluent, is withdrawn from bed B. This raffinate mixture is typically separated into an eluent fraction and a non-normal-paraffin hydrocarbon fraction by downstream processing facilities not a part of the adsorption process and not here shown. The separated eluent fraction is usually recycled. Also during the process step depicted in FIG. 1(a), a continuous flow of eluent 30 is passed to a previously loaded bed C for desorption of normal paraffins therein. A process adsorbate product 40 is withdrawn from bed C. This adsorbate product is then typically separated into a feed normal paraffin fraction and an eluent fraction by downstream processing facilities not shown, and the eluent recycled to the adsorption process.

The prior art process step depicted in FIG. 1(a) is continued until bed A is loaded to substantially full capacity with adsorbate and desorption of bed C is essentially complete, at which time process flows are switched to the step of FIG. 1(b). Now, referring to this Figure, the continuous flow of hydrocarbon feed, again designated 10, is passed directly to sieve bed B which serves as a sole adsorption bed for this process step. The continuous eluent flow 30 is passed to bed A to purge non-adsorbed feed hydrocarbons from the void spaces therein. Since the purge effluent stream 31 from purge bed A contains quantities of unadsorbed and desorbed normal paraffins, it is passed to freshly desorbed bed C which serves as a purge guard bed wherein these normal paraffins can be captured. Effluent from bed B and effluent from bed C, both composed substantially of feed non-normal-paraffin hydrocarbons and eluent, may be combined as shown in a single raffinate product 20. Alternatively, the two effluent streams may be maintained as separate raffinate products for downstream use or processing. There is no process adsorbate product stream during the process step of FIG. 1(b).

Once bed A has been effectively purged of non-normal-paraffin hydrocarbons, process flows are switched to the step illustrated in FIG. 1(c). This step is in principle very similar to that of FiG. 1(a), as is indicated by process stream designations common to the two figures. Here, however, bed A is the desorption bed, bed B is the primary adsorption bed, and bed C is the secondary adsorption bed. The process is in turn switched to the steps of FIGS. 1(d), 1(e), and 1(f). Upon completion of the step of FIG. 1(f), the process is switched to that of FIG. 1(a). The six step process sequence is continuously repeated in this manner as many times as is desired. The service of each bed in each of the six process steps is summarized in Table I:

TABLE I

| The step of: | bed A | bed B | bed C |
| --- | --- | --- | --- |
| FIG. 1(a) | primary adsorption | secondary adsorption | desorption |
| FIG. 1(b) | purge | sole adsorption | purge guard |
| FIG. 1(c) | desorption | primary adsorption | secondary adsorption |
| FIG. 1(d) | purge guard | purge | sole adsorption |
| FIG. 1(e) | secondary adsorption | desorption | primary adsorption |
| FIG. 1(f) | sole adsorption | purge guard | purge |

In view of the continuous cyclic nature of this process, it has been termed the "Merry-Go-Round" process.

Despite the commercial success which the process of U.S. Pat. No. 3,451,924 has enjoyed, there are a number of disadvantages associated with its operation and performance. For instance, it is observed through reference to FIG. 1 that there is no process adsorbate product stream during three of the six process steps. In the process steps depicted in FIGS. 1(a), 1(c) and 1(e), there is a process raffinate product 20 which closely corresponds in mass flowrate to the hydrocarbon feed. In addition, there is also during these three steps, a process adsorbate product 40 which closely corresponds in mass flowrate to the eluent stream. However, in the steps of FIGS. 1(b), 1(d), and 1(f), there is only a raffinate product stream which corresponds in mass flowrate to the sum of that of the feed and eluent streams. Downstream processing of such vapor-phase product streams which are subject to repeated discontinuities in flowrate and composition has proven most difficult. For example, it has been impossible to implement efficient heat conservation measures and fully stable downstream processes for eluent recovery from adsorbate and raffinate product streams.

Furthermore, the lack of adsorbate product flow during the three steps of the prior art process can be viewed as a measure of process inefficiency with respect to optimizing the utilization of the sieve material. During these three steps, two of the three beds, and therefore two-thirds of the sieve adsorbent, is employed for purge and purge guard service rather than directly in adsorption for recovery of desired n-paraffins from a hydrocarbon feed.

Still further, the use of a freshly desorbed sieve bed for purge guard service in the prior art process steps of FIGS. 1(b), 1(d), and 1(f) has adverse affects upon the performance of this same bed in immediately subsequent adsorption service. The purge stream contains not only the non-normal-paraffin feed hydrocarbons that are being purged from the purge bed voids but also a considerable amount of feed normal paraffins which were eluted from the purge bed by the purge eluent flow. In the prior art process the feed normal paraffins are adsorbed from the purge effluent stream by the front part of the purge guard bed. However, the purge guard bed is next switched to secondary adsorption service, where the flow to the bed is for the most part a mixture of non-normal-paraffin feed hydrocarbons and eluent desorbed from the primary adsorption bed. The eluent in this flow tends to broaden the adsorption front in the secondary bed by desorbing feed normal paraffins from the front part of the bed which, in turn, are then readsorbed further downstream in the bed where the concentration of feed n-paraffins is lower. As a consequence, at the time the bed is switched from secondary adsorption to primary adsorption, the feed normal paraffins are not adsorbed in a sharp adsorption front near the inlet to the sieve bed, but instead are spread throughout the bed. When hydrocarbon feed is passed over the bed during its subsequent primary adsorption service, breakthrough of feed normal paraffins into the bed effluent is encountered well before the bed is loaded to the desired capacity.

SUMMARY OF THE INVENTION

The instant invention provides an improved multi-bed continuous cyclic vapor-phase molecular sieve adsorption process for the separation of normal paraffins from a hydrocarbon mixture containing normal paraffins and non-normal-paraffin hydrocarbons, which substantially alleviates the afore-mentioned problems associated with the prior art, and which, overall, functions to substantially increase the efficiency of utilization of the sieve material. According to the invention, a continuous flow of a feed mixture and a continuous flow of an eluent are passed in repetitions of a particular sequence of six process steps to at least four molecular sieve beds to accomplish separation of the mixture into an adsorbate product fraction comprising normal paraffins and a raffinate product fraction comprising non-normal-paraffin hydrocarbons. The process steps may be described as follows:

step one, in which
  the feed mixture is passed through a first adsorbent bed,
  effluent is withdrawn from the first bed and passed through a second adsorbent bed,
  a major portion of the eluent flow is passed through a third adsorbent bed,
  a minor portion of the eluent flow is passed through a fourth adsorbent bed,
  adsorbate product is withdrawn as effluent from the third bed and from the fourth bed, and
  raffinate product is withdrawn as an effluent from the second bed;

step two, in which
  the feed mixture is passed through the second bed,
  a major portion of the eluent flow is passed through the third bed,
  a minor portion of the eluent flow is passed through the first bed,
  effluent from the first bed is withdrawn and is passed through the fourth bed,
  adsorbate product is withdrawn as effluent from the third bed, and
  raffinate product is withdrawn as effluent from the second bed and from the fourth bed;

step three, in which the feed mixture is passed through the second bed,
effluent is withdrawn from the second bed and passed through the third bed,
a major portion of the eluent flow is passed through the first bed,
a minor portion of the eluent flow is passed through the fourth bed,
adsorbate product is withdrawn as effluent from the first bed and from the fourth bed,
raffinate product is withdrawn as an effluent from the third bed;

step four, in which
the feed mixture is passed through the third bed,
a major portion of the eluent flow is passed through the first bed,
a minor portion of the eluent flow is passed through the second bed,
effluent from the second bed is withdrawn and is passed through the fourth bed,
adsorbate product is withdrawn as effluent from the first bed, and
raffinate product is withdrawn as effluent from the third bed and from the fourth bed;

step five, in which
the feed mixture is passed through the third bed,
effluent is withdrawn from the third bed and passed through the first bed,
a major portion of the eluent flow is passed through the second bed,
a minor portion of the eluent flow is passed through the fourth bed,
adsorbate product is withdrawn as an effluent from the second bed and from the fourth bed, and
raffinate product is withdrawn as an effluent from the first bed; and step six, in which
the feed mixture is passed through the first bed,
a major portion of the eluent flow is passed through the second bed,
a minor portion of the eluent flow is passed through the third bed,
effluent from the third bed is withdrawn and is passed through the fourth bed,
adsorbate product is withdrawn as effluent from the second bed, and
raffinate product is withdrawn as effluent from the first bed and from the fourth bed.

In practice, the separation process of the invention has the advantages which have characterized the conventional multi-bed molecular sieve adsorption process of U.S. Pat. No. 3,451,924. As with this known process, the invention can be carried out using continuous flows of both feedstock and eluent to the beds. The invention likewise provides a secondary adsorption bed which prevents the breakthrough of normal paraffins into the raffinate product as the primary adsorption bed nears full capacity.

Additionally, practice of the process of the invention provides numerous advantages over the prior art. For instance, the invention provides an uninterrupted flow of adsorbate product throughout the process and a composition in both raffinate and absorbate products that is more nearly constant throughout the repeated sequential switching between the several process steps. These aspects of the invention are seen to be of great practical advantage when consideration is given to downstream processing of adsorbate and raffinate products, e.g., for purposes of heat conservation, eluent recovery, etc.

Since both product streams are vapor-phase, it is particularly difficult to dampen the substantial discontinuities in flowrate and concentration which result from the sequential switching through the process steps of the prior art.

Further substantial benefit is provided by the invention through the utilization of the fourth adsorbent bed as the only bed having a purge guard service, recapturing n-paraffins purged from each of the other three beds between their adsorption and desorption service. The first, second, and third beds are thus relieved of the purge guard duty to which they were subject in the process of U.S. Pat. No. 3,451,924. When these beds begin their subsequent adsorption service, they do not already contain a level of feed normal paraffins deposited therein during purge guard duty, and thus they have a greater capacity for adsorption of additional normal paraffins from the feedstock flow. Moreover, elimination of the purge guard duty for the first, second, and third beds avoids the noted problems of the prior art, associated with disrupting the sharpness of the adsorption front. Still further advantage is provided by the invention through a more complete desorption of each of the first, second, and third adsorbent beds. Each of the three principal adsorption beds is desorbed by a flow of eluent therethrough during two of the six process steps, rather than only one step as in the prior art process sequence.

In certain preferred embodiments, the invention can be operated so as to take advantage of increased capacity for normal paraffin adsorption in the three principal beds and to thereby achieve substantially greater efficiency in the utilization of the sieve. Thus, while the invention can be seen, in comparison to the prior art, to entail the use of an additional sieve bed, the four beds employed in the invention can be operated to accomplish a greater recovery of n-paraffin per a given quantity of sieve adsorbent than can the three beds operated in accordance with conventional processing.

DESCRIPTION OF THE PREFERRED EMBODIMENTS

The invention summarily described above can be more fully illustrated through reference to the attached FIG. 2. Schematically depicted therein is the operation of four molecular sieve beds, designated A, B, C, and D, through a sequence of six process steps each of which is individually shown in the parts of FIG. 2 labeled (a) through (f).

Figure 1A:
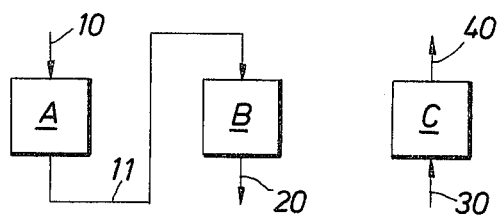
Figure 1B:
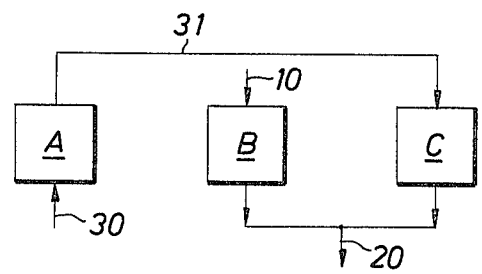
Figure 1C:
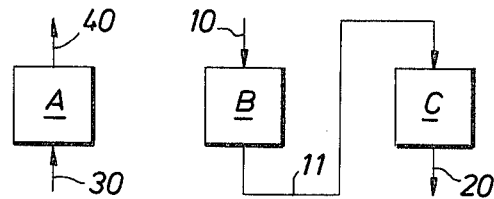
Figure 1D:
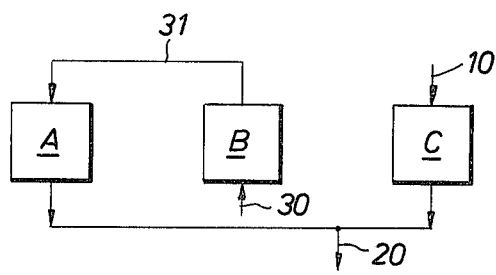
Figure 1E:
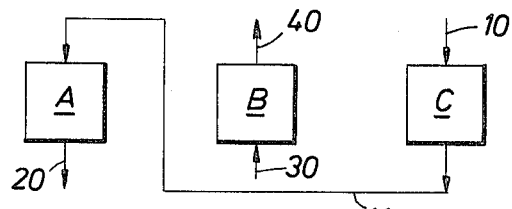
Figure 1F:
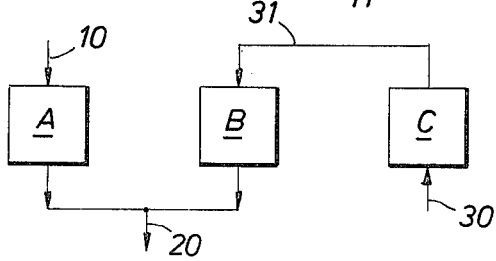
Figure 2A:
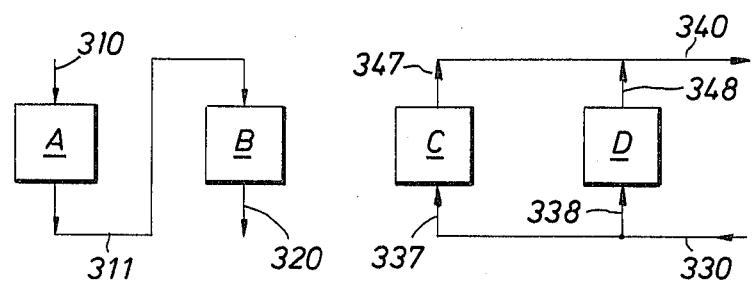

Looking first to FIG. 2(a), illustrated therein is step one of a cyclic process according to the invention, in which step a continuous flow of a vapor-phase normal-paraffin-containing hydrocarbon feed stream designated 310 is passed to sieve bed A which functions as a primary adsorption bed to adsorb said normal paraffins. Effluent, stream 311, is withdrawn from bed A and passed to a second bed B which serves as a secondary adsorption bed, capturing feed normal paraffins which "break through" sieve bed A. A process raffinate product, stream 320, with a feed normal paraffin content substantially reduced from that of stream 310, is withdrawn from bed B. Also during the process step depicted in FIG. 2(a), a continuous flow of eluent vapor 330 is passed to the sieve beds. A major portion of this eluent flow, designated 337, is introduced into bed C, which has been previously loaded with feed normal paraffins, for desorption thereof from the sieve. A minor portion 338 of the total continuous flow of eluent vapor 330 is passed to bed D for elution of the normal paraffin contained therein as a result of the bed's previous use in what is termed purge-guard service. As the terminology is used herein, elution is intended to be equivalent in principle to desorption, both relating to the removal of feed normal paraffin from sieve pores by the action of a flow of eluent through the sieve bed. To avoid confusion, however, this function is termed elution when applied to the fourth (i.e., purge-guard) bed and is referred to as desorption if applied to the other sieve beds. In the process step of FIG. 2(a), an effluent 347, consisting primarily of feed normal paraffins and eluent, is withdrawn from bed C, the bed undergoing desorption. An effluent stream 348 is withdrawn from bed D the bed undergoing elution. In view of their composition of eluent and feed normal paraffins, both effluents 347 and 348 are termed adsorbate product. These two effluents may suitably be either combined into a single stream 340 as indicated, e.g., for purposes of downstream processing to separate the feed normal paraffins and eluent therein, or maintained as separate product flows.

Figure 2B:
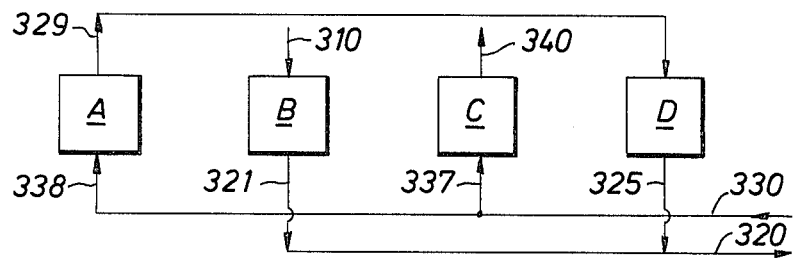

The process step depicted in FIG. 2(a) is continued until bed A is loaded to substantially full capacity with feed normal paraffins and elution of feed normal paraffin from bed D is substantially complete, at which time the process is switched to step two illustrated by FIG. 2(b). Referring to this Figure, a major portion 337 of the total eluent flow 330 continues to be passed to bed C for desorption purposes, while a minor portion 338 of the eluent flow is passed to bed A for purge of non-adsorbed feed hydrocarbons from the void spaces thereof. Adsorbate product 340 is withdrawn only from bed D during this step of the process. An effluent stream 329 is withdrawn from bed A and introduced into bed D which is now in purge-guard service, recovering normal paraffins incidentally removed from bed A by action of the flow of eluent therethrough from purge purposes. A purge-guard bed effluent, substantially free of feed normal paraffins is withdrawn from bed D as stream 325. The hydrocarbon feed mixture 310 is passed to bed B which functions as the sole adsorption bed in this step of the process, i.e., the only bed adsorbing paraffins directly from the feed. Effluent from bed B, stream 321, is by composition a raffinate product consisting substantially of non-normal feed hydrocarbons and eluent. Stream 321 may be combined with effluent 325, also a raffinate product, to give a single product stream 320 as shown, or, alternatively, the two raffinate streams may be individually maintained for purposes of downstream processing.

Figure 2C:
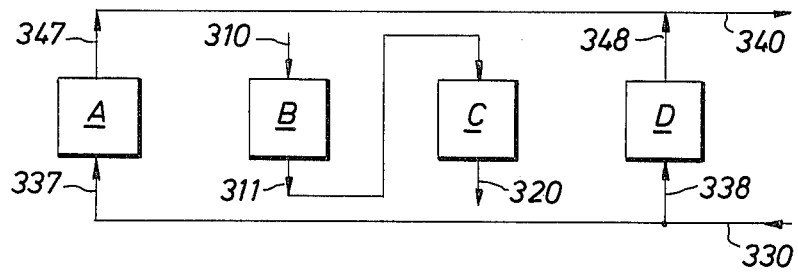

When, by operation in accordance with step 2, bed A has been effectively purged of non-normal-paraffin feed hydrocarbons and desorption of bed C is substantially complete, but, in any event, before there is excessive breakthrough of feed normal paraffins into the effluent from bed B, process flows are switched to step three shown in FIG. 2(c). During this step, the continuous flow of feed mixture 310 is passed to primary adsorption bed B. Effluent stream 311 from bed B is passed to freshly desorbed bed C which now is in secondary adsorption service. Raffinate product 320 is withdrawn from bed C. Bed A undergoes desorption. A major portion 337 of the total eluent flow (330) is introduced into bed A and an adsorbate effluent 347 is withdrawn. A minor portion 338 of the total eluent flow (330) is passed to bed D for eluent from the sieve therein of that feed normal paraffin which was adsorbed during the purge-guard duty of bed D in step two. Effluent 348 from bed D, an adsorbate stream by composition, is withdrawn from bed D and here combined with effluent 347 to yield a total adsorbate product 340 for this process step.

Figure 2D:
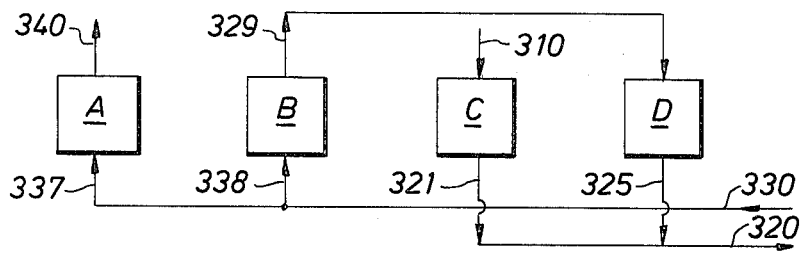

Once, through operation of step three, bed B has been effectively loaded with feed normal paraffins and elution of feed normal paraffins from bed D is substantially complete, the process is switched to step four, as illustrated by FIG. 2(d). In this step, a minor portion 338 of the eluent flow is passed to bed B for purge purposes. Effluent 329 is withdrawn from bed B and passed to bed D, which is again in purge-guard service. A major portion 337 of the eluent continues to be passed to bed A for desorption. Adsorbate product 340 is withdrawn from bed A. The hydrocarbon feed mixture 310 is passed to bed C, which is in sole adsorption service. Effluent 321 from bed C and effluent 325 from bed D are combined to yield a single raffinate product stream 320.

Figure 2E:
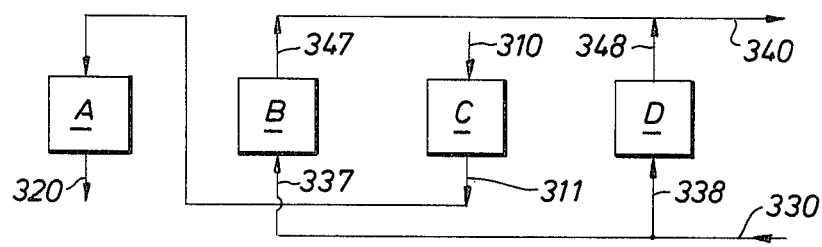

Upon completion of the purge of bed B and the desorption of bed A in step four, and before significant breakthrough of feed normal paraffins into the effluent from bed C, the process is switched to step five as shown in FIG. 2(e). In step five, the continuous feed stream 310 is directed to primary adsorption bed C. Effluent 311 from this bed is passed to secondary adsorption bed A. Raffinate product 320 is withdrawn from bed A. A major portion 337 of the total eluent flow (330) is passed to bed B for desorption purposes, and a minor portion 338 of the eluent flow is passed to bed D for elution purposes. Effluent 347 from bed B and effluent 348 from bed D combine to give the adsorbate product stream 340.

Figure 2F:
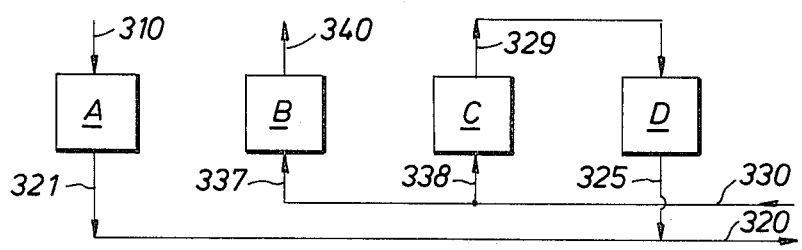

Step five is continued until bed C is effectively loaded with feed normal paraffin and elution of bed D is substantially complete, at which time the process flows are switched to the configuration of step six, illustrated by FIG. 2(f). For purposes of this process step, the feed hydrocarbon flow 310 is introduced into sieve bed A, which is in sole adsorption service. A major portion 337 of the eluent flow is passed to bed B for desorption service, and adsorbate product 340 is withdrawn from bed B. A minor portion 338 of the eluent flow is passed to bed C for purge purposes. Effluent stream 329 is withdrawn from bed C and passed to bed D, serving in purge-guard duty. The effluent flow 325 from bed D is combined with effluent 321 from bed A to yield total raffinate product 320.

Upon completion of step six, i.e., when feed normal paraffins have been effectively desorbed from bed B and non-normal-paraffin hydrocarbons have been purged from bed C, but before there is significant breakthrough of feed normal paraffins into the effluent from bed A, the process has undergone one full cycle. Process flows are now switched to step one and the sequence of steps one through six repeated in the manner described as many times as is desired.

The functions of each of the four sieve beds in each of the six process steps of the invention are recited in Table II.

TABLE II

|  | bed A | bed B | bed C | bed D |
| --- | --- | --- | --- | --- |
| Step one | primary adsorption | secondary adsorption | desorption | elution |
| Step two | purge | sole adsorption | desorption | purge-guard |

TABLE II-continued

|  | bed A | bed B | bed C | bed D |
|---|---|---|---|---|
| Step three | desorption | primary adsorption | secondary adsorption | elution |
| Step four | desorption | purge | sole adsorption | purge-guard |
| Step five | secondary adsorption | desorption | primary adsorption | elution |
| Step six | sole adsorption | desorption | purge | purge-guard |

For the sake of clarity, FIG. 2, through which the invention is described above, omits a detailed showing of the full array of interconnecting flow conduits, valves, and optional instrumentation which are employed to switch the process flows through the invention's full cycle of six steps. The description of the invention herein also omits detailed description of known procedures for the use of one or more beds in addition to the four required for practice of the invention to enable periodic regeneration of each bed. For instance, a fifth adsorbent bed can be provided so that process continuity is maintained during regeneration of one bed, in which case the six step process description applies to the remaining four beds which are utilized at any given time. Such equipment and procedures for their operation are considered obvious to one skilled in the art and thus do not require elaborate description herein.

Generally, in the practice of the cycle of process steps of the invention, it is necessary that consideration be given to such matters as the type and amount of molecular sieve to be employed in the multiple adsorption beds, the operating temperatures and pressures of the beds and the several process vapor streams, the flowrates and compositions of feed and eluent for adsorption, desorption and purge, and the periodic regeneration of each sieve bed. It can be said that the influence of these matters upon the operation of the process of the invention is not significantly different from their influence upon related prior art multiple bed molecular sieve adsorption processes. In other words, the process of the invention is in essence seen to alter only the sequence of process steps for the use of multiple sieve beds in the separation of normal paraffins from a mixed vapor-phase hydrocarbon feed, and not to necessitate material change in the parameters recognized by the prior art as suitable for operation of any individual sieve bed. Thus, selection of such operating parameters and general procedures for the process of the invention can be made on the basis of principles well known in the art. For instance, suitable and preferred operating parameters for use in the separation of normal paraffins having from about 5 to 30 carbon atoms, and particularly those having from about 11 to 15 carbon atoms, from non-normal-paraffin hydrocarbons are described in U.S. Pat. No. 3,451,924, the teachings of which are incorporated herein by reference.

Specific to the invention is a division, in each process step, of the total eluent flow, so that two eluent streams may be simultaneously introduced into different sieve beds. The greater of these two streams, herein termed a major portion of the eluent flow, is utilized for desorption service, while the other, termed a minor portion, is employed for purposes of purge or elution. It is not critical to the invention that the division of eluent be the same in the different process steps, so long as the relative, i.e., major/minor, quantitative relationship is maintained.

For most advantageous performance, specific preference can be stated for certain processing parameters. Thus, the invention is best operated in such a manner that the flowrate of the major portion of eluent for desorption purposes be between about four and eight times the flowrate of the normal paraffins in the feedstock. (Maximum flow of feedstock and/or eluent to any of the beds is limited by such factors as adsorption bed size, attrition of sieve material, lifting of sieve beds if operated in upflow, etc.) The minor portion of the eluent flow should be of a sufficient flow over a given purge step to fill the void spaces of the bed undergoing purge, preferably between two and ten times the volume of the bed void spaces, most preferably between three and six times the void volume. During elution service, the flow of the minor portion of eluent flow preferably totals, over the period of the elution, between about four and eight times the quantity of feed normal paraffin adsorbed on the fourth bed. Overall, preference can generally be stated for operation of the invention to provide a division of eluent flow into a major portion comprising between about 60 and 90 percent of the total and a minor portion comprising the remaining 10 to 40 percent; typically a division such that the major portion contains between about 70 and 85 percent of the total eluent and the minor portion contains between about 15 and 30 percent is considered most preferred.

In addition to processing advantages related to improved continuity in product flows and to the sharpening of the adsorption front in the sieve beds, the invention can be operated so as to provide further benefit through optimizing utilization of sieve material. In multi-bed molecular sieve adsorption processes of the prior art, each of the beds contained approximately the same amount of sieve. The size of each bed, in terms of its content of molecular sieve, was determined according to requirements for adsorption and desorption service. Beds sized on this basis are unnecessarily large for use in purge-guard service. In the context of the four-bed process of this invention, improved utilization of the sieve, and enhanced processing capacity can be realized if the fourth bed is smaller, i.e., contains a lesser quantity of sieve, than the other three beds. For instance, it is preferred that each of the first, second, and third beds contains approximately the same amount of sieve, and that the fourth bed contains between about 10 and 50 percent of that amount. Most preferably, the fourth bed contains between about 15 and 40 percent of the sieve in each of the other beds. However, it is not critical to the practice of the invention in its broader scope that the fourth bed be of a smaller size in comparison to the other three. In particular, there may be substantial benefit in other respects from the use, in performing the invention, of four beds of approximately the same size. For instance, while the prior art process of U.S. Pat. No. 3,451,924 utilizes only three adsorbent beds for normal paraffin recovery, its application in practice typically requires four beds. At any time, one of the four beds is removed from the prior art Merry-Go-Round process sequence for the purpose of regeneration of the sieve it contains. It is generally the case that regeneration of the bed is completed well before it need be returned to the process flow sequence, i.e., when another bed requires regeneration. Thus, in certain embodiments of the process of U.S. Pat. No. 3,451,924 there is provided a fourth sieve bed which stands idle for substantial periods, during which it is neither being regenerated nor used in the three-bed paraffin recovery process. During these periods, the four beds may be operated according to the present invention. At such time as one of the four beds requires regeneration, operations can be returned to the process of the prior art patent until this regeneration is complete.

Illustration of an embodiment of the process of the invention and a comparison of its performance with that of the prior art may be realized through the following Example and Comparative Example.

COMPARATIVE EXAMPLE

According to the process of U.S. Pat. No. 3,451,924, as described above with reference to FIG. 1, three molecular sieve adsorption beds, each containing about 120,000 lbs of a type 5 A molecular sieve (a total of 360,000 lbs for all beds), are utilized to separate a vapor phase $C_{11}$ to $C_{14}$ kerosene stream of continuous and constant flowrate (882 lb mols per hour) into a normal-paraffin-containing adsorbate product and a non-normal-paraffin-containing raffinate product. A continuous and constant flow (1359 lb mols per hour) of normal octane eluent is supplied to the process. The temperature of all process flows and all beds is about 660° F. Feed enters the process at a pressure of approximately 42 psig; eluent is supplied at a pressure of about 58 psig.

Under these conditions, a commercially practiced embodiment of the process of U.S. Pat. No. 3,451,924 yields an adsorbate product flow of 1249 lb mols per hour during process steps 1, 3, and 5, and a flow of 0 lb mols per hour during process steps 2, 4, and 6, for an overall average of 1110 lb mols per hour. Raffinate product flow is 980 lb mols per hour during steps 1, 3, and 5, and 2339 lb mols per hour during steps 2, 4, and 6, giving an overall average of 1131 lb mols per hour. In actual practice for separation of a typical kerosene feedstock, the process of this comparative example yields an adsorbate product containing about 90 percent of the normal paraffins present in the feedstock and a raffinate product comprising substantially all of the feedstock's non-normal-paraffin hydrocarbons.

EXAMPLE

For purposes of describing the practice and the performance of the invention, the same three molecular sieve adsorbent beds are now employed together with a fourth (purge-guard) bed containing about 30,000 lbs of the 5 A molecular sieve. By addition of this fourth sieve bed, total sieve quantity is increased 8.3% over that utilized for the comparative example.

These four beds are applied in accordance with the invention to the separation of a continuous, constant flow of 1058 lb mols per hour of the same $C_{11}$ to $C_{14}$ kerosene feedstock material, an increase of 20% over the flowrate of feed in the comparative example.

A flow of normal octane eluent is again supplied, and is utilized in each process step as two streams—a major portion and a minor portion of the total eluent, in accordance with the invention. For the convenience of this illustration, the total normal octane eluent flow of 1631 lb mols per hour (again representing a 20% increase over that of the comparative example) is held constant throughout the sequence of process steps. Likewise, the major portion of eluent flow is a constant 1187 lb mols per hour and the minor portion a constant 444 lb mols per hour during all six process steps.

Process temperatures and pressures are the same as described in the comparative example.

In terms of product quality, the separation of feedstock into a normal-paraffin-containing adsorbate product and a non-normal-paraffin-containing raffinate product through practice under this example would be essentially equivalent to that obtained through operation of the above prior art comparative example. In terms of a comparison of the efficiency of utilization of sieve material for this separation, an increase of approximately 20% in processing capacity would be realized through only an 8.3% increase in sieve material associated with the addition of the fourth adsorbent bed. In other words, there typically can be achieved by practice of the invention a roughly ten percent increase in the effective working capacity of a given quantity of sieve, over that capacity which characterized the process of U.S. Pat. No. 3,451,924 at like operating conditions.

In terms of the continuity of the process product flows, substantial improvement is similarly achieved in comparison to the prior art. For instance, whereas in the comparative example the total process adsorbate product flowrate repeatedly undergoes discontinuous change between 0 and 1249 lb mols per hour, in this example of the invention the corresponding change would only be between 1099 and 1483 lb mols per hour. Likewise, total raffinate product flow in the process of this example would vary only between 1176 and 1620 lb mols per hour in contrast to the 980 to 2339 lb mols per hour variation encountered in practice of the prior art comparative example. Like contrasts between the performance of the invention and that of the prior art can be drawn with regard to continuity of composition in the product streams. For instance, in process steps one, three, and five, the raffinate product of the comparative example is substantially non-normal-paraffin hydrocarbons, while in steps two, four, and six the raffinate is principally composed of normal octane eluent. Composition in the raffinate is much more nearly constant through all steps of the example according to the invention and is always primarly non-normal-paraffin hydrocarbons.

I claim as my invention:

1. An improved process for using at least four molecular sieve adsorbent beds to effect the resolution of a continuous flow of a vapor-phase hydrocarbon feed mixture containing normal paraffins and non-normal-paraffin hydrocarbons into an adsorbate product fraction comprising normal paraffins and a raffinate product fraction comprising non-normal-paraffin hydrocarbons, which process comprises repeated sequential performance of the following steps:

step one, in which
  the feed mixture is passed through a first adsorbent bed,
  effluent is withdrawn from the first bed and passed through a second adsorbent bed
  a major portion of a continuous flow of an eluent is passed through a third adsorbent bed,
  a minor portion of the continuous flow of the eluent is passed through a fourth adsorbent bed,
  adsorbate product is withdrawn as effluent from the third bed and from the fourth bed, and
  raffinate product is withdrawn as an effluent from the second bed;

step two, in which
  the feed mixture is passed through the second bed,
  a major portion of the eluent flow is passed through the third bed, a minor portion of the eluent flow is passed through the first bed, effluent is withdrawn from the first bed and is passed through the fourth bed, adsorbate product is withdrawn as effluent from the third bed, and raffinate product is withdrawn as effluent from the second bed and from the fourth bed;

step three, in which the feed mixture is passed through the second bed, effluent is withdrawn from the second bed and passed through the third bed, a major portion of the eluent flow is passed through the first bed, a minor portion of the eluent flow is passed through the fourth bed, adsorbate product is withdrawn as effluent from the first bed and from the fourth bed, raffinate product is withdrawn as an effluent from the third bed;

step four, in which the feed mixture is passed through the third bed, a major portion of the eluent flow is passed through the first bed, a minor portion of the eluent flow is passed through the second bed, effluent is withdrawn from the second bed and is passed through the fourth bed, adsorbate product is withdrawn as effluent from the first bed, and raffinate product is withdrawn as effluent from the third bed and from the fourth bed;

step five, in which the feed mixture is passed through the third bed, effluent is withdrawn from the third bed and passed through the first bed, a major portion of the eluent flow is passed through the second bed, a minor portion of the eluent flow is passed through the fourth bed, adsorbate product is withdrawn as an effluent from the second bed and from the fourth bed, raffinate product is withdrawn as an effluent from the first bed; and step six, in which the feed mixture is passed through the first bed, a major portion of the eluent flow is passed through the second bed, a minor portion of the eluent flow is passed through the third bed, effluent is withdrawn from the third bed and is passed through the fourth bed, adsorbate product is withdrawn as effluent from the second bed, and raffinate product is withdrawn as effluent from the first bed and from the fourth bed.

2. The process of claim 1, wherein the mass flowrate of the major portion of the eluent flow in each process step is between about four and eight times the mass flowrate of the normal paraffins in the feed mixture.

3. The process of claim 1, wherein the fourth bed contains a quantity of molecular sieve which is at most about equal to the average quantity of sieve contained in each of the other three beds, and wherein in each process step the flowrate of the minor portion of the eluent flow is between about 10 and 40 percent of the sum of the flowrates of the major portion and the minor portion of the eluent flow.

4. The process of claim 3, wherein the fourth bed contains a quantity of molecular sieve that is between about 10 and 50 percent of the quantity of sieve contained in each of the other three beds.

5. The process of claim 3, wherein the normal paraffins have between about 8 and 20 carbon atoms.

6. The process of claim 5, wherein the hydrocarbon feed mixture is kerosene.

7. The process of claim 6, wherein the normal paraffins have between about 11 and 15 carbon atoms.

8. The process of claim 1, wherein both the major portion of the eluent flow and the minor portion of the eluent flow are characterized by substantially constant flowrates throughout the six process steps.

* * * * *